(12) United States Patent
Gilfix

(10) Patent No.: US 7,813,276 B2
(45) Date of Patent: Oct. 12, 2010

(54) METHOD FOR DISTRIBUTED HIERARCHICAL ADMISSION CONTROL ACROSS A CLUSTER

(75) Inventor: Michael A. Gilfix, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 11/456,440

(22) Filed: Jul. 10, 2006

(65) Prior Publication Data

US 2008/0008090 A1    Jan. 10, 2008

(51) Int. Cl.
    *H04L 12/26* (2006.01)
(52) U.S. Cl. .................................................. 370/230
(58) Field of Classification Search ................. None
    See application file for complete search history.

(56) References Cited

U.S. PATENT DOCUMENTS

| | | | | |
|---|---|---|---|---|
| 5,357,507 | A * | 10/1994 | Hughes et al. | 370/234 |
| 5,636,212 | A * | 6/1997 | Ikeda | 370/233 |
| 5,878,029 | A * | 3/1999 | Hasegawa et al. | 370/236 |
| 6,118,791 | A * | 9/2000 | Fichou et al. | 370/468 |
| 6,144,639 | A * | 11/2000 | Zhao et al. | 370/235 |
| 6,687,731 | B1 | 2/2004 | Kavak | |
| 2005/0174972 | A1* | 8/2005 | Boynton | 370/337 |
| 2007/0076653 | A1* | 4/2007 | Park et al. | 370/328 |

FOREIGN PATENT DOCUMENTS

WO    99/32956    7/1999

OTHER PUBLICATIONS

Dorian Ivancic, Analysis of precision of the HTB packet scheduler, Oct. 2005, Faculty of Electrical Engineering and Computing Unska 3, 10000 Zagreb, Croatia.*
Ivancic, Dorian, "Analysis of precision of the HTB packet scheduler", Oct. 2005, Faculty of Electrical Engineering and Computing Unska 3, 10000 Zagreb, Croatia, p. 1-4.*
Voigt et al., "In-Kernel Mechanisms for Adaptive Control of Overloaded Web Servers," Sep. 13, 2000, pp. 1-8.
Aron et al., "Cluster Reserves: A Mechanism for Resource Management in Cluster-Based Network Servers," Proceedings ACM Sigmetrics International Conference on Measurement and Modeling of Computer Systems, vol. 28, No. 1, Jun. 2000, pp. 90-101.

* cited by examiner

*Primary Examiner*—Chirag G Shah
*Assistant Examiner*—Steve Young
(74) *Attorney, Agent, or Firm*—David A. Mims, Jr.; Kevin L. Daffer

(57) ABSTRACT

A network cluster is provided herein having a plurality of cluster members. In order to control the admission of client requests sent to the cluster, one member of the cluster is elected "reservation coordinator." The reservation coordinator runs a reservation algorithm for controlling the distribution of rate capacity across members of the cluster. For example, each member of the cluster may reserve some amount of rate from the coordinator to allow for passing of client requests. To ensure that each member is provided with the appropriate rate capacity, each member of the cluster runs an estimation algorithm to determine whether or not additional rate capacity should be reserved from the reservation coordinator, or released back into the cluster for redistribution. The estimation algorithm is run in real-time and allows the admission control algorithm to adapt to changes in rate distribution.

14 Claims, 9 Drawing Sheets

METHOD FOR DISTRIBUTED HIERARCHICAL ADMISSION CONTROL ACROSS A CLUSTER

BACKGROUND OF THE INVENTION

1. Field of the Invention

This invention relates to computer networking and, more particularly, to methods for implementing admission control procedures across a network cluster having a plurality of cluster members.

2. Description of the Related Art

The following descriptions and examples are given as background only.

In the context of computer networking, the term "availability" usually refers to a network node's ability to respond to requests no matter what the circumstances. For example, a continuously available node may be characterized as having essentially no downtime within a given timeframe (e.g., one year). However, since most network nodes experience at least some amount of downtime, they are typically characterized as having a certain level of availability. For instance, a "high availability" node may be described as having approximately 99.9% uptime, which may translate into a few hours of planned or planned downtime per year.

More specifically, the term "high availability" usually refers to the maintenance of high levels of access to network processes and associated data without comprising quality user experience. Network processes that benefit from or strive to maintain high availability include, but are not limited to, administrative processes, firewall processes, load balancing processes, operating system processes and various types of server processes (e.g., HTTP server, application server and database server processes). High availability may also be desired for various types of network data, such as application data used by application servers, persistent session data, security data and transaction log files, among others.

Clustering is one approach for accomplishing high availability. In many cases, a "cluster" may be described as two or more machines (referred to as "cluster members"), which are coupled together across a local high-speed network (i.e., a high-speed Local Area Network, or LAN). Cluster members may be connected to the LAN via any network topology (e.g., via a bus, star, ring, or mesh configuration). Although not typically the case, cluster members residing at different geographical locations may be coupled across a Wide Area Network, or WAN (one example of which is the Internet). A generic depiction of a network cluster 100 coupled to a LAN 110 is illustrated in FIG. 1. The dotted line in FIG. 1 denotes the possibility of cluster members being coupled across a WAN 120.

High availability clusters improve the availability of services by providing redundant nodes, each configured for running a common application(s). This configuration enables the nodes (i.e., cluster members) to share the workload and assume additional load, should one of the nodes fail. High availability clusters are commonly used to implement key databases, file sharing on a network, business applications and consumer services, such as electronic commerce (e-commerce) websites.

In some cases, multiple cluster members may be defined on the same physical machine (i.e., vertically scaled clusters) to allocate the processing power available to that machine in a more efficient manner. In other cases, cluster members may be created across multiple machines (i.e., horizontally scaled clusters). The latter enables a single application to run on several different machines, while presenting a single system image. This allows client requests, which would otherwise overwhelm a single machine, to be distributed across several different machines. In some cases, a combination of vertical and horizontal scaling may be used when creating a cluster to reap the benefits of both techniques.

The term "network traffic control" typically refers to the process of managing, prioritizing, controlling or reducing network traffic to reduce congestion, latency and packet loss. In addition to other features, network traffic control includes bandwidth management and admission control procedures.

"Bandwidth management" is usually described as the process of measuring and controlling the amount of traffic on a network link to: i) avoid filling the link to capacity, or ii) overfilling the link, which would result in network congestion and poor performance. Two common bandwidth management techniques include rate limiting and traffic shaping.

"Rate limiting" controls the rate at which traffic is sent or received on a network interface. Traffic that is less than or equal to the specified rate is sent, whereas traffic that exceeds the rate is dropped or delayed. Rate limiting is typically performed by policing (i.e., discarding excess packets), queuing (i.e., delaying packets in transit) or controlling congestion (i.e., manipulating the protocol's congestion mechanism). A device that performs rate limiting is referred to as a "rate limiter."

"Traffic shaping" is often described as an attempt to control network traffic in order to optimize or guarantee performance, low latency and/or bandwidth. Traffic shaping algorithms usually deal with concepts of classification, queue disciplines, policy enforcement, congestion management, quality of service (QoS) and fairness. The most common traffic shaping algorithms are the Token Bucket and Leaky Bucket algorithms.

The Token Bucket algorithm dictates when traffic can be transmitted based on the presence of "tokens" in the bucket. For example, a "token bucket" may contain at most b tokens (usually representing a particular number of bytes). A "token" is added to the bucket every 1/r seconds (referred to as the token regeneration rate). If the bucket is full when the token arrives, it is discarded. When a packet of n bytes arrives, n tokens are removed from the bucket and the packet is sent to the network. However, if fewer than n tokens are available, no tokens are removed from the bucket and the packet is considered to be non-conformant. Non-conformant packets may be: i) dropped, ii) queued for subsequent transmission when sufficient tokens have accumulated in the bucket, or iii) transmitted but marked as non-conformant, so that they can be subsequently dropped if the network becomes overloaded. The Token Bucket algorithm, therefore, controls the amount of data that is injected into a network by imposing a limit on the average data transmission rate. In other words, the Token Bucket algorithm allows "bursts" of data to be sent (up to its peak burst rate) if there are adequate tokens in the bucket and the burst threshold is configured properly.

The Leaky Bucket algorithm differs from the Token Bucket by imposing a hard limit on the data transmission rate. For example, imagine that incoming packets are placed into a bucket with a "hole" in the bottom. As before, the bucket may hold up to b bytes. If a packet arrives when the bucket is full, it is discarded. Unlike the Token Bucket, packets are allowed to filter out of the "leaky" bucket at a constant rate of 1 bytes per second. Such filtering imposes a hard limit on the data transmission rate (by enforcing space between packets) and produces the effect of smoothing out bursty data.

In general, the term "admission control" refers to the ability to monitor, control and enforce the use of network resources and services based on certain criteria. For example, in networks that strive to provide Quality of Service (QoS), admission control procedures may be used to accept or reject user sessions (or individual flows) based on various priority settings, policies and/or available bandwidth. Service Level Agreements (SLAs) represent one manner in which admission control concepts may be enforced, for example, by service and by requester (i.e., user or client) to provide the requester with guaranteed levels of service (e.g., specific guarantees on uptime, latency, restoral time per failure, packet loss, etc.). Other types of admission control exist.

Most approaches to admission control provide rate limit enforcement at the packet or transport level request. For example, a common admission control algorithm is to imagine a bucket with a limit imposed on the rate of messages entering a protected network node. A token is added to the bucket each time a new message is processed. The bucket contents are cleared after each interval (e.g., every second) to provide rate limiting without enforcement of space between messages. This sliding window method is often referred to as a "rate limiter bucket," and is only used during periods of active traffic.

Although appropriate for some networks, conventional bandwidth management and admission control procedures are not well-suited to networks that include clusters. Therefore, a need remains for improved procedures that can be used to protect network resources, services and applications running in a clustered environment.

SUMMARY OF THE INVENTION

The following description of various embodiments of a network cluster and methods for reserving and releasing rate capacity is not to be construed in any way as limiting the subject matter of the appended claims.

According to one embodiment, a network cluster is provided herein having a plurality of cluster members. In some cases, the cluster members may reside on a single physical machine, or may be distributed across multiple machines. In most cases, the cluster members may be coupled together via a high-speed Local Area Network (LAN). In a specific aspect of the invention, one member of the cluster may be elected "reservation coordinator." As described in more detail below, the reservation coordinator may run a reservation algorithm for controlling the distribution of rate capacity across members of the cluster. For example, each member of the cluster may reserve some amount of rate from the coordinator to allow for passing of client requests. In order to accommodate changes in rate distribution, each member of the cluster may run an estimation algorithm (referred to herein as the "estimator") for executing a real-time rate capacity estimation.

As described in more detail below, the estimator may determine when to reserve additional rate capacity and when to release rate capacity back into the cluster for redistribution to other cluster members. For example, a cluster member may send a reservation request to the reservation coordinator for reserving additional rate, if the estimator determines that additional rate capacity is needed to satisfy the influx of client requests currently being sent to the cluster member. Likewise, rate capacity may be released back into the cluster for redistribution, if the estimator determines that the current rate capacity assigned to a cluster member is being underutilized. In most cases, rate capacity is requested and released in chunks to increase speed and cut down on inter-group messaging (which consumes bandwidth on the communication paths between cluster members).

According to one embodiment, a method is provided herein for controlling the admission of client requests sent to a network cluster having a plurality of cluster members. In some cases, the method may begin by receiving a client request for a service or operation provided by one of the cluster members. As described in more detail below, the client request may have a weight assigned thereto. Next, the method may access a tree structure stored within the cluster member that received the client request.

In general, the tree structure may include a plurality of levels, a plurality of nodes, and at least one branch. One of the nodes—a root node—occupies a highest level of the tree structure. A given branch of the tree structure connects a parent node in a given level to a child node in a level directly below the given level. Each node of the tree structure includes a bucket for accepting tokens up to a maximum rate limit, which is specified for that bucket as a maximum number of tokens added per time period. For this reason, the tree structure may be referred to herein as a "rate limiter bucket tree."

Next, the method may traverse the tree structure to find the chain of buckets, which descend from the root node to a child node corresponding to the requested service or operation. In some cases, the client request may be admitted, if a number of request tokens (equal to the weight of the client request) can be added to each bucket within the chain of buckets without exceeding the maximum rate limit specified for any bucket in the chain. However, if adding the request tokens causes any bucket within the chain of buckets to exceed its maximum rate limit for that time period, the method may attempt to reserve additional rate capacity to satisfy the client request.

In order to reserve additional rate capacity, the method may send a reservation request to the estimation algorithm. In some cases, the estimation algorithm may return a zero reservation amount (indicating that the reservation request should not be satisfied at this time), if the reservation request is sent within a designated silence period. In most cases, the client request may be rejected upon receiving a zero reservation amount from the estimation algorithm. On the other hand, the estimation algorithm may return a non-zero reservation amount (indicating that the reservation request could be satisfied at this time), if the reservation request is sent after the designated silence period ends. In most cases, the silence period may be used to keep the cluster members from sending additional reservation requests when there is no possibility of reserving more rate.

Upon receiving a non-zero reservation amount from the estimation algorithm, the reservation request may be sent to the reservation algorithm to determine whether or not sufficient rate capacity remains within the cluster to satisfy the reservation request. In some cases, the reservation algorithm may return a zero reservation amount, if insufficient rate capacity remains within the cluster to satisfy the reservation request. In most cases, the client request may be rejected upon receiving a zero reservation amount from the reservation algorithm. On the other hand, the reservation algorithm may return a non-zero reservation amount, if sufficient rate capacity remains within the cluster to satisfy the reservation request.

In order to determine whether sufficient rate capacity remains within the cluster, the reservation algorithm may compare the current rate consumption of all cluster members (stored within individual "member trees") to the maximum rate limits specified for each member of the cluster (stored within a "cluster tree"). If the additional rate capacity asked for by the cluster member causes the combined reservation capacity of all members to exceed the reservation amounts specified in the cluster tree, the reservation algorithm rejects the reservation request and returns a reservation amount of zero. Otherwise, the reservation algorithm accepts the reservation request and returns a non-zero reservation amount.

Receiving a non-zero reservation amount from the reservation algorithm indicates that additional rate capacity can be reserved by the cluster member making the request. To reflect the additional reservation amount, the tree structure of the cluster member is updated with the non-zero reservation amount received from the reservation algorithm. Once the tree structure is updated, the method determines whether or not the cluster member has enough rate capacity to satisfy the client request. For example, the method may traverse the updated tree structure to get the new chain of buckets descending from the root node to the child node corresponding to the requested service or operation. In some cases, the client request may be admitted, if the request tokens can be added to each bucket within the new chain of buckets without exceeding the maximum rate limit specified for any bucket in the chain. However, if adding the request tokens causes any bucket within the new chain of buckets to exceed its maximum rate limit for that time period, the client request will be rejected.

In addition to reserving additional rate capacity, a method is provided herein for releasing rate capacity back into the cluster for redistribution to other cluster members. In some cases, the method for releasing rate capacity may begin by receiving one or more client requests, each having a weight assigned thereto, over the course of a current time period. Next, the method may calculate an average rate for the current time period by summing the weights of the client requests received during the current time period and dividing the sum by the current time period. A current rate consumption trend may then be determined by comparing the average rate calculated for the current time period to an average rate calculated for a previous time period. For example, the method may determine the current rate consumption trend to be: (i) increasing, if the average rate for the current time period is higher than the average rate for the previous time period, (ii) steady, if the average rate for the current time period is equal to the average rate for the previous time period, or (iii) decreasing, if the average rate for the current time period is lower than the average rate for the previous time period.

In most cases, the method may decide whether or not to release rate capacity from one member of the cluster based on the current rate consumption trend and a current reservation amount allocated to that cluster member. For example, rate capacity may be released from the cluster member if: (a) the current rate consumption trend is determined to be steady or decreasing, and (b) the cluster member has more reserved rate than it is currently using. In some cases, the method may determine that a cluster member has more reserved rate than it is currently using if a difference between the current reservation amount and the average rate for the current time period is greater than a predetermined amount (e.g., a release chunk size). On the other hand, rate capacity may not be released from the cluster member if: (a) the current rate consumption trend is determined to be increasing, or (b) the current reservation amount is zero.

BRIEF DESCRIPTION OF THE DRAWINGS

Other objects and advantages of the invention will become apparent upon reading the following detailed description and upon reference to the accompanying drawings in which.

Figure 1:
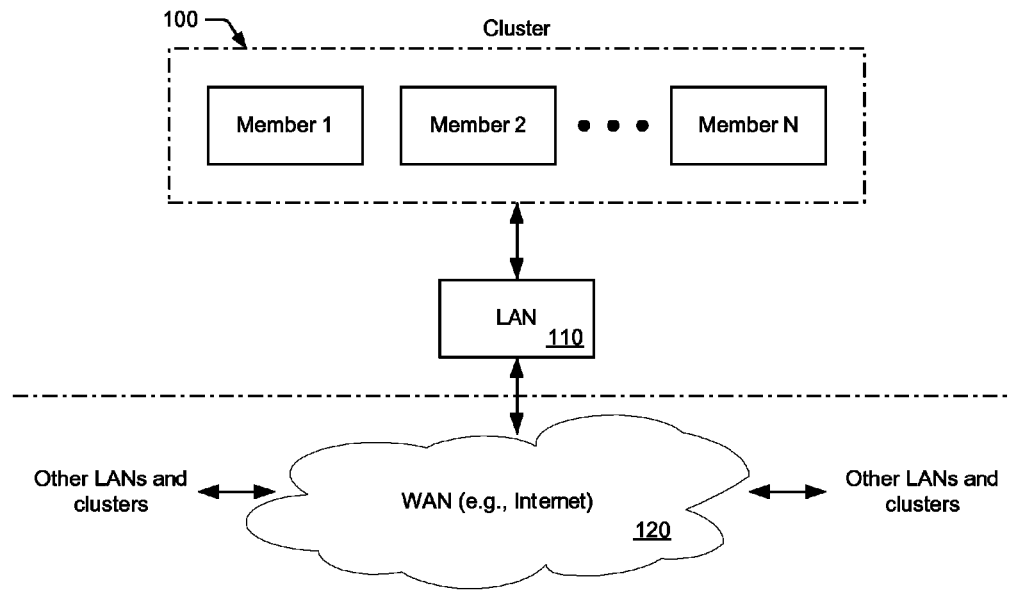
FIG. 1 is a block diagram illustrating a generic description of a network cluster.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

In many cases, a network cluster is defined as two or more machines ("cluster members"), which are coupled together across a Local Area Network (LAN) or Wide Area Network (WAN). In general, a network cluster may be created to: i) provide load balancing by distributing the workload across cluster members, ii) improve performance by splitting a computational task among cluster members, or iii) improve the availability of services by providing redundant nodes running a common application(s). Clusters implemented to improve the availability of services are typically referred to as "high availability clusters."

In one example, a high availability cluster may include a set of application servers that are managed together and participate in workload management (WLM). The application servers (i.e., cluster members) participating in a cluster can be implemented on the same network node, or on different nodes. A "cluster," therefore, is more commonly described as a logical representation of the machine(s) participating in the cluster and the workload capacity associated with those machine(s). In addition to application servers, clusters may be created by coupling other types of servers and systems, such as HTTP servers, load balancers, database servers and other data storage media.

Figure 2:
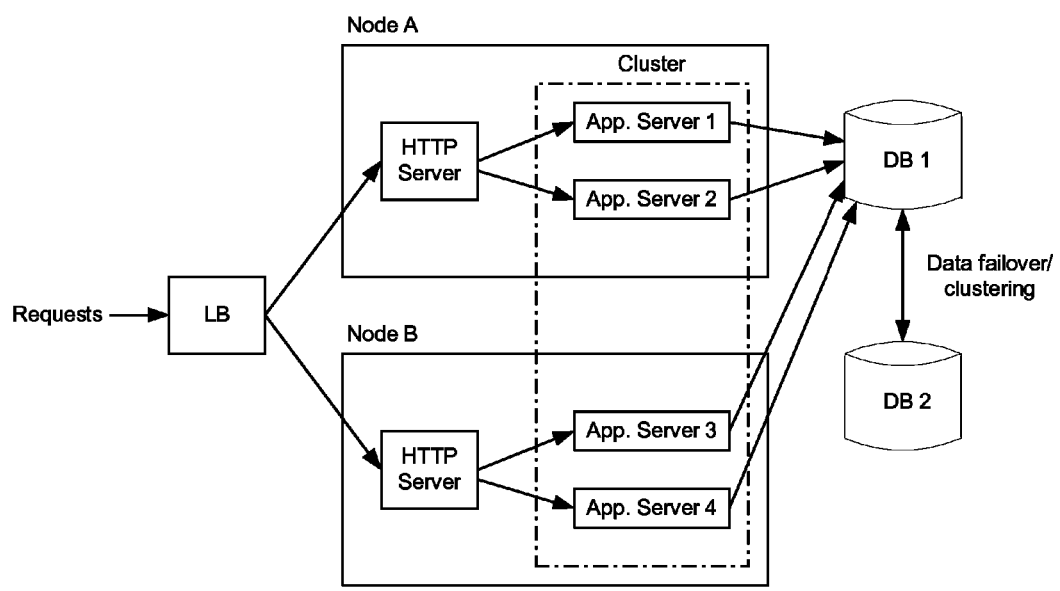
FIG. 2 is a block diagram illustrating one manner in which application and database servers may be coupled to form clusters.

FIG. 2 illustrates one manner in which a group of application servers (e.g., Application Servers 1-4) may be clustered together across multiple network nodes (e.g., nodes A and B). In most cases, the network nodes may be coupled across a high-speed LAN, although a WAN may be used in other cases. In the specific example of FIG. 2, the clustered application servers are scaled, both vertically and horizontally, to optimize processing power and distribute workload, while maintaining a single system image. In addition, the configuration shown in FIG. 2 supports data failover by creating a cluster of database servers (e.g., DB 1 and DB 2). Other cluster configurations not specifically illustrated herein may also be created, as desired.

In some cases, the workload (i.e., the amount of requests sent to the cluster) may be distributed or "balanced" between cluster members (Application Servers 1-4) with the help of a load balancer (LB) and HTTP servers. To improve the availability of services, applications deployed to the cluster are run on all cluster members concurrently. In some cases, high availability may be provided by implementing workload management (WLM) and failover procedures. For example, workload management may allow cluster members to share the workload and improve the throughput of client requests by controlling the manner in which requests are routed to the cluster members. If a server within the cluster fails, any client requests currently being sent to the failed server can be redirected to one of the remaining active servers. Such failover is typically performed without interruption of service or requiring any special action on the part of the client.

In some cases, the application servers shown in FIG. 2 may utilize a high availability framework for monitoring the health of the services and applications running on the servers. One example of a high availability framework may be found, for example, in the WebSphere Application Server (WAS) developed by IBM. The WebSphere Application Server runs proprietary IBM software designed to set up, operate and integrate e-business applications across multiple computing platforms using Web service technologies. The network deployment version 6.0 of WAS supports deployment of a clustered cell configuration with failover support and provides a proxy server, load balancing and content-based routing.

The high availability framework provides a number of key features including, but not limited to: i) group membership (i.e., the ability to distinguish members of a cluster as belonging to a group), ii) coordinator election (i.e., the ability to elect one or more members of a cluster as a coordinator), iii) inter-group messaging (i.e., the ability to send messages to members of the group), and iv) virtual synchronicity (i.e., the ability to achieve virtually synchronous operations through messaging over a fast, low-latency LAN). As described in more detail below, the high availability framework originally included within WAS has been updated by the present invention to provide admission control and traffic shaping procedures for a clustered environment. However, the inventive concepts described herein are not limited to a WAS environment, and may be applied to substantially any cluster.

Most prior art admission control and traffic shaping algorithms are run locally within edge routers situated on the outskirts or "edges" of a network. The rate limits and bucket contents used by these algorithms are typically enforced/tracked for each machine within the network. For this reason, prior art admission control and traffic shaping algorithms are generally not applicable to clustered environments, where it may be desirable to enforce rate limits and track bucket contents for individual applications, services and/or operations shared between multiple cluster members. In addition, prior art algorithms simply cannot adapt to changes in rate distributions, such as those that may occur within services and applications that rely on session affinity (i.e., a condition that disables workload management after the initial connection and forces a client's requests to be sent to the same server).

Examples of services and applications that rely on session affinity include e-commerce websites and other Web Services that maintain user information (e.g., user shopping carts) throughout a session. In another example, session affinity may be relied upon in web applications that bind requests using the same, back-end database. The requests are routed to the same application server to avoid database errors. In addition, applications that utilize the Session Initiation Protocol (SIP) rely on session affinity for routing all requests for a given session to a particular application server.

To overcome the aforementioned problems, the high availability framework has been updated to provide a means for distributing rate limits and bucket contents across multiple members of a cluster. Improved admission control and traffic shaping algorithms are also provided for monitoring and controlling the distribution of rate limits and bucket contents between cluster members. This enables the algorithms to adapt to changes in rate distributions (for admission control) and burst allocation (for traffic shaping). For example, if the rate distribution to the cluster changes (but does not exceed a global rate limit), the improved admission control algorithm allows rate to be re-proportioned among members of the cluster according to the new distribution. The improved traffic shaping algorithm uses a similar approach for redistributing burst allocation between active cluster members, should one or more cluster members fail or be taken off-line.

Figure 6:
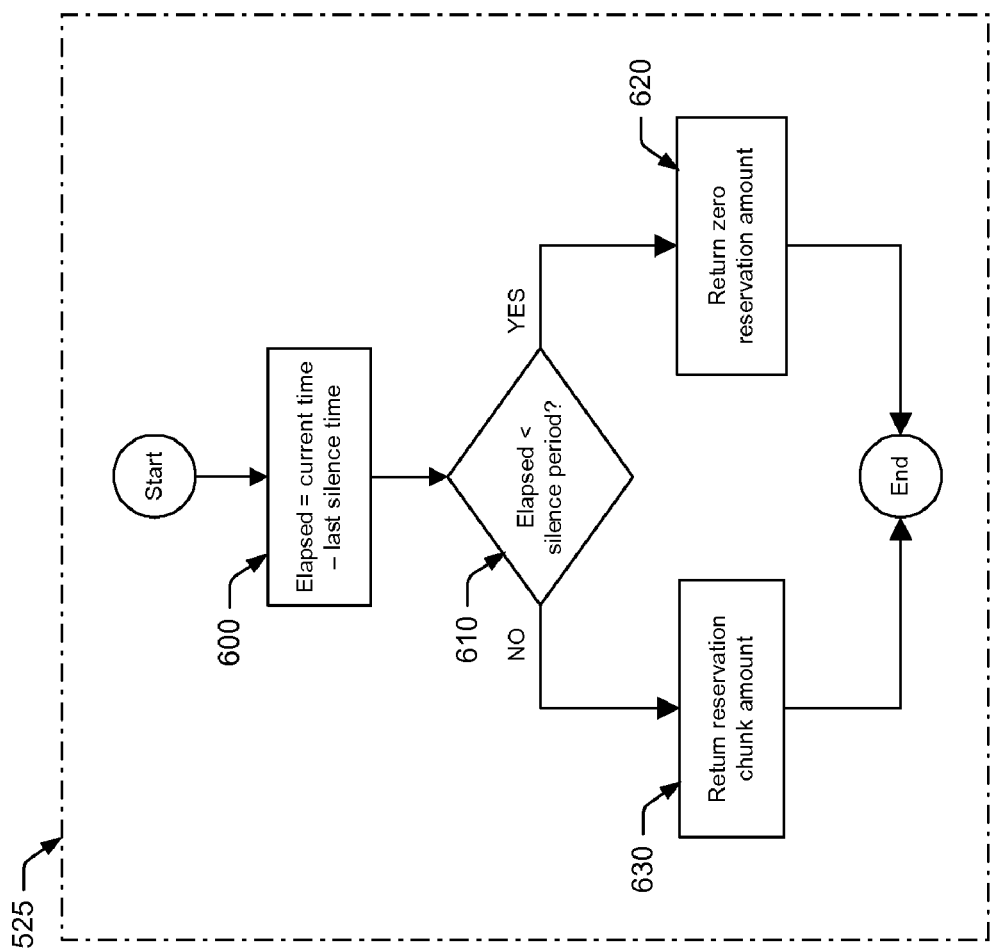
FIG. 6 is a flow chart diagram illustrating one manner in which an estimation algorithm may be used to determine when to reserve additional rate capacity in the admission control algorithm of FIG. 5.
Figure 7:
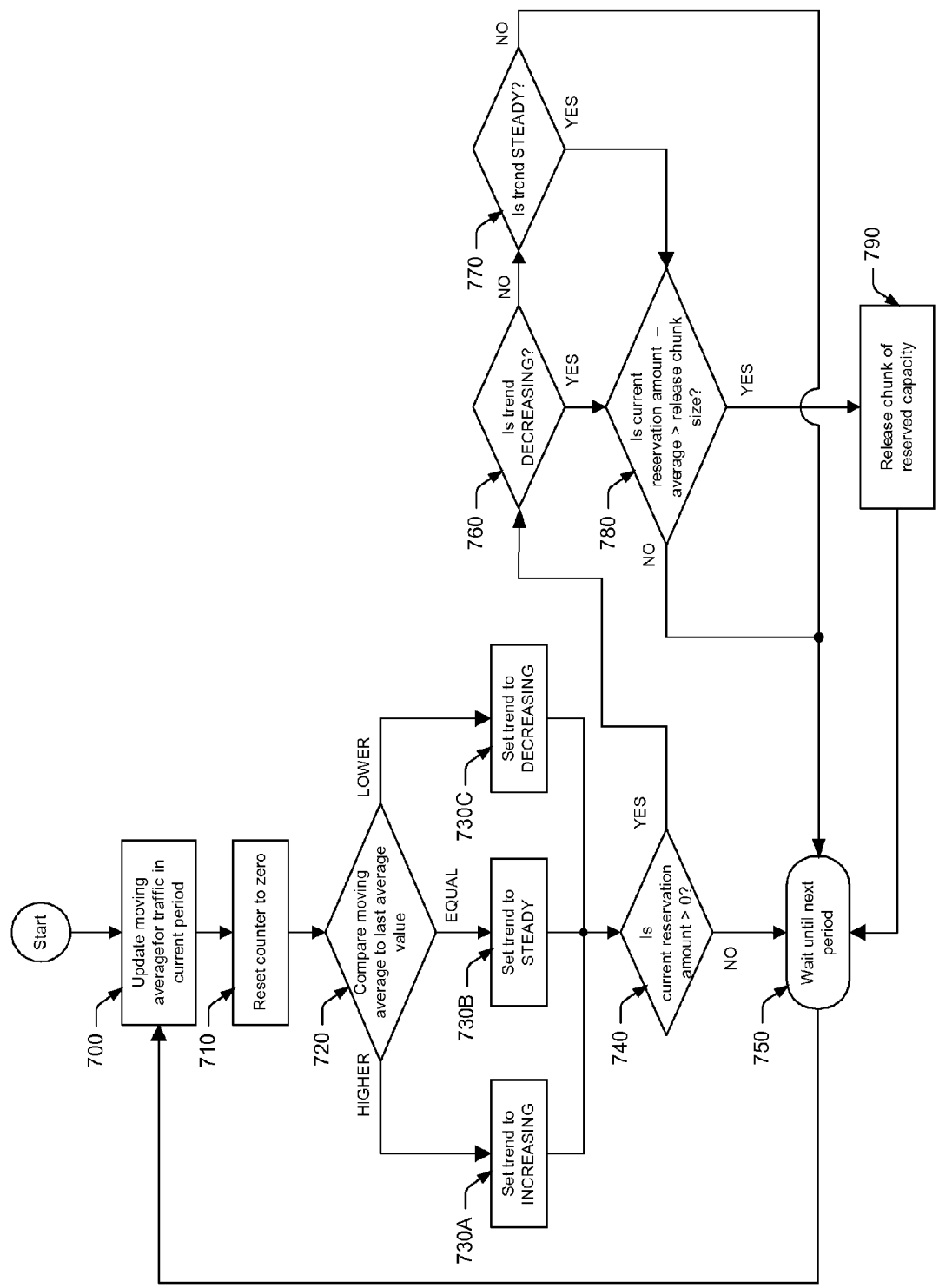
FIG. 7 is a flow chart diagram illustrating one manner in which an estimation algorithm may be used to determine when to release rate capacity in the admission control algorithm of FIG. 5.
Figure 8:
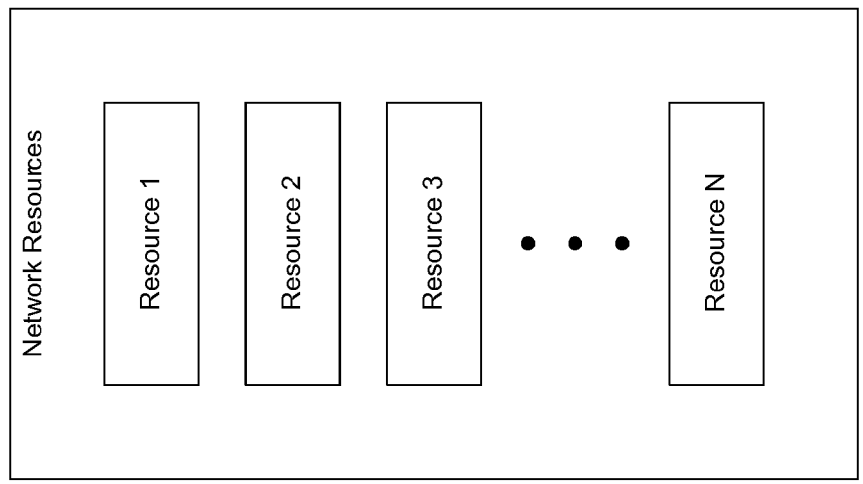
FIG. 8 is a block diagram illustrating one manner in which cluster members may track usage of network resources.
Figure 8:
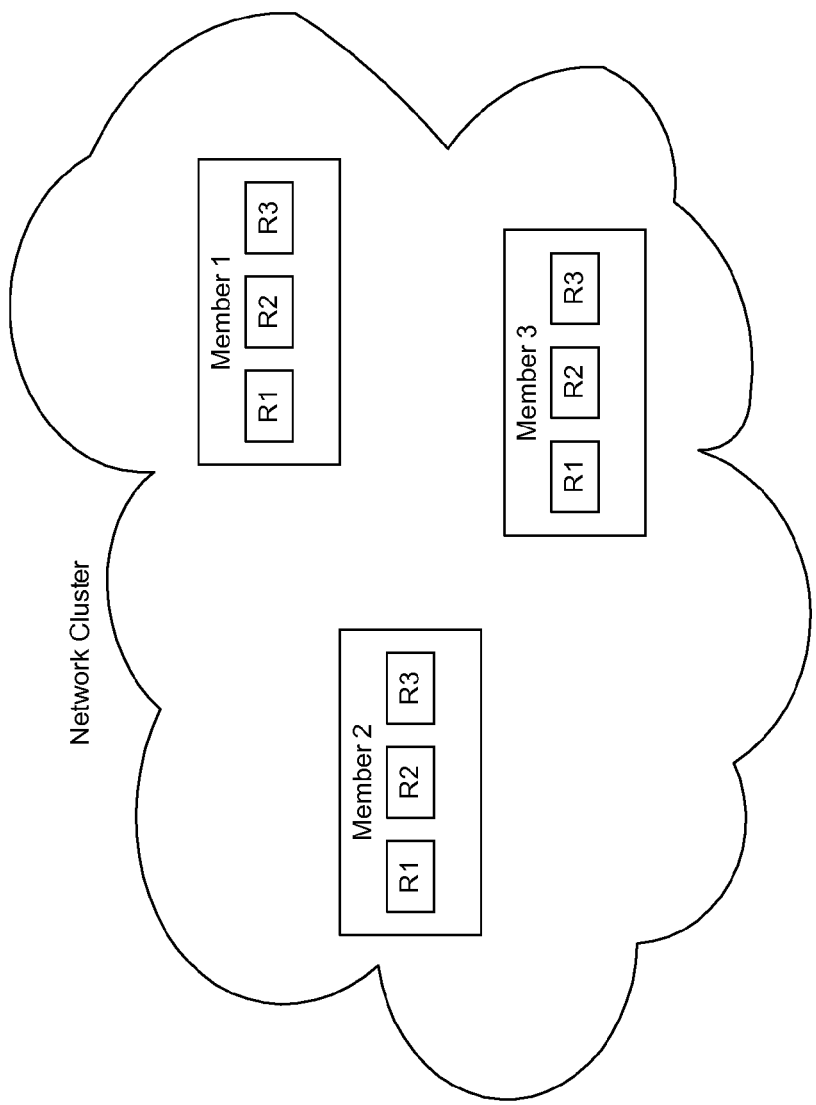

FIGS. 3-11 illustrate various aspects of the invention. For example, FIGS. 3-4 demonstrate various ways in which rate limits may be distributed across multiple cluster members (e.g., members 1 ... N) in a hierarchical fashion. As described in more detail below, a rate limit tree may be used for distributing rate limits across cluster members, as well as the various services, applications and operations provided by those members. Flow chart diagrams are provided in FIGS. 5-7 to illustrate one embodiment of an improved admission control algorithm, in accordance with the invention. Additional flow chart diagrams are provided in FIGS. 9-11 to describe how the improved traffic shaping algorithm may be used to monitor and control usage of network resources. FIG. 8 illustrates one manner in which burst allocation for the resources may be dynamically distributed and tracked among cluster members.

The improved admission control and traffic shaping algorithms described herein are similar in that each utilizes the key features of a high availability framework. For example, one member of the cluster is elected "reservation coordinator." As described in more detail below, any member of the cluster may be elected coordinator. Should the elected coordinator fail for any reason, a new election is made, a message is sent out to each member to reset their state (via inter-group messaging) and the algorithms begin again. The elected coordinator acts as a rate dealer. For example, each member must reserve some rate from the coordinator to allow for passing of requests. To accommodate changes in rate distribution, each member of the cluster runs an estimation algorithm (referred to as the "estimator") for executing a real-time rate capacity estimation.

As described in more detail below, the estimator is used to determine when to reserve additional rate capacity or release rate capacity back into the cluster. For example, a cluster member may send a reservation request to the active coordinator for reserving additional rate, if the estimator determines that additional rate capacity is needed to satisfy the influx of client requests currently being sent to the cluster member. Likewise, rate capacity may be released back into the cluster for redistribution, if the estimator determines that the current rate capacity assigned to a cluster member is being underutilized. In most cases, rate capacity is requested and released in chunks to increase speed and cut down on inter-group messaging (which consumes bandwidth on the communication paths between cluster members).

Hierarchical Rate Limiting for Admission Control:

As noted above, the "rate limiter bucket" is an algorithm commonly used to implement admission control procedures. In the prior art algorithm, a "bucket" is provided with a limit imposed on the rate of messages entering a protected network node. A "token" is added to the bucket each time a new message is processed. As such, the rate limit is often expressed in tokens per second, with one token representing one message. The bucket contents are cleared after each interval (e.g., every second) to provide rate limiting without enforcement of space between packets.

To illustrate such an algorithm, assume that the rate limit imposed on the bucket is 10 tokens per second. Assume also that a first request adds 2 tokens to the bucket and a second request adds 8 tokens to the bucket, all within the same time period. Because the limit was reached after the first two requests, the algorithm provides rate limiting by rejecting subsequent requests that arrive within the same time period.

Although appropriate for some networks, the prior art admission control algorithm described above is not applicable to clustered environments. For example, the rate limit imposed on the bucket represents the rate capacity for the entire cluster. The prior art algorithm provides absolutely no means for distributing rate capacity among cluster members to account for the needs of the various services, applications and operations provided by the cluster members. The prior art algorithm also fails to provide a means for monitoring and controlling the distribution of rate capacity, and therefore, cannot be used to protect services and applications that cause the rate distribution to change (such as converged applications and other services that rely on session affinity).

Figure 3:
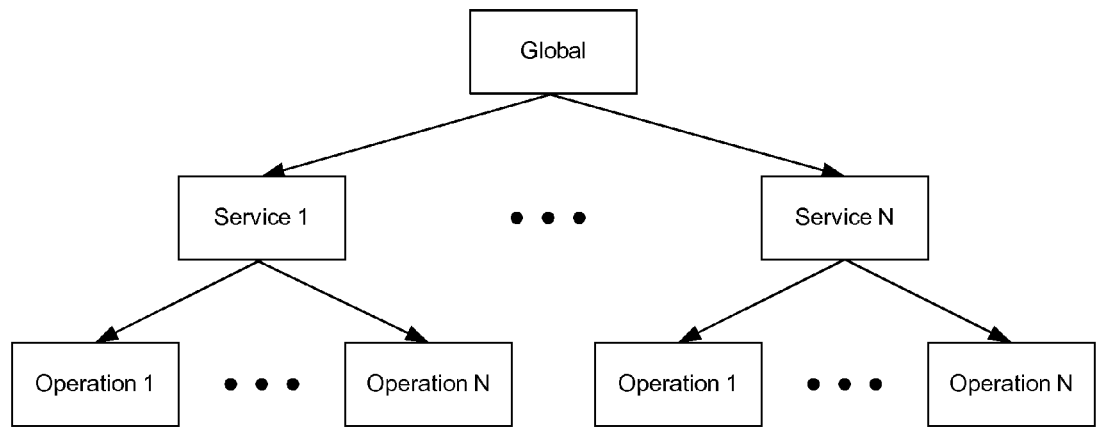
FIG. 3 is a block diagram illustrating a rate limit tree or rate limiter bucket tree, according to one embodiment of the invention.
Figure 4:
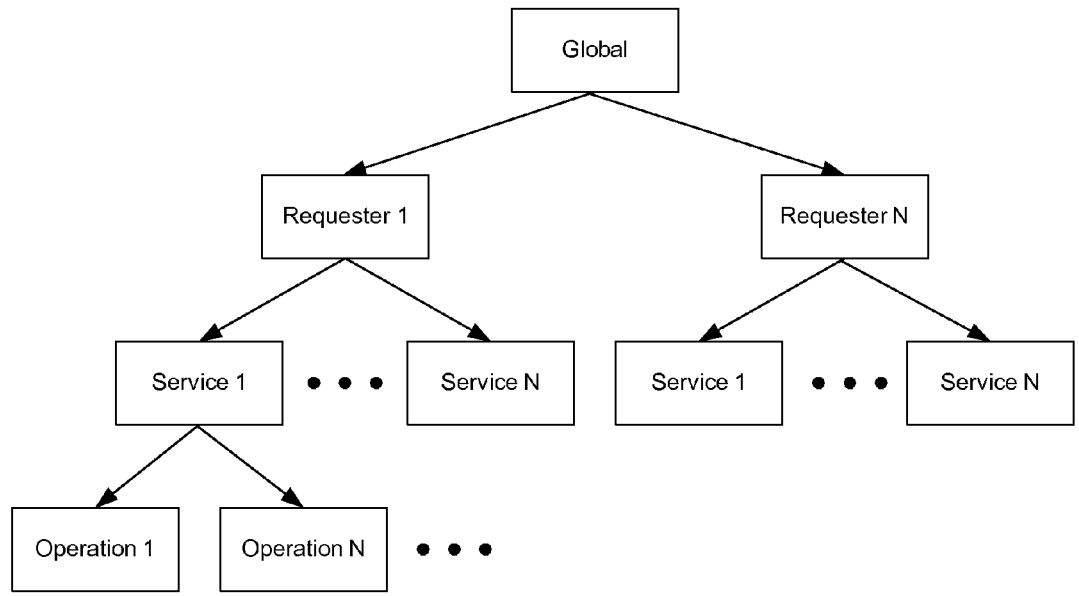
FIG. 4 is a block diagram illustrating a rate limit tree or rate limiter bucket tree, according to another embodiment of the invention.

To overcome the disadvantages mentioned above, the basic rate limiter algorithm has been expanded to provide hierarchical rate limit enforcement for admission control. Instead of specifying a global rate limit for the entire cluster, the global rate limit is distributed among cluster members, as desired. As shown in FIGS. 3-4, rate limits may be distributed in a hierarchical fashion forming a "rate limit tree." In some embodiments, rate limits may be set at the global level, as well as the service and operation levels for each member (1-N) of the cluster, as shown in FIG. 3. One example of services and operations that may be provided by cluster members is the StockQuote service and getQuote( ) operation used in many Web Services; however, other examples exist. It is noted that different numbers and/or types of levels may be included within the rate limit tree, in other embodiments of the invention. The only requirement imposed on the rate limit tree is that each rate limit imposed on a parent node equals the sum of the limits imposed on its children. For example, the rate limit assigned to Service 1 should be equivalent to the sum of the limits assigned to Operations 1-N descending from Service 1.

As noted below, the improved admission control algorithm may also include a "rate limiter bucket tree" for tracking the rate consumption at each level specified in the "rate limit tree." In some cases, bucket contents may be measured in abstract tokens (i.e., tokens that do not necessarily correspond to one packet). This allows for weighting, i.e., some requests may consume more than one token. For example, if the request rate is N tokens per second and the weight of each request is one, the token limit corresponds to N requests per second. If the weight of each request is M, the token limit corresponds to N/M requests per second.

When verifying if a request can be admitted, the rate limiter bucket tree is traversed along a path extending from the global level to one of the child nodes. As noted above, the rate limit assigned to each bucket along the path is the sum of its children. In order to admit a request to a child node (e.g., Operation 1), the request must be able to fit within each bucket along the traversed path (e.g., Global→Service 1→Operation 1). If the request fits within each bucket, the request token(s) are added to each bucket along the path. If the request token(s) do not fit within each bucket along the path, they are not added and the request is rejected.

To illustrate such an algorithm, assume that a rate limit of 100 tokens per second is assigned to Service 1, while rate limits of 75 tokens per second are assigned to each of the Operations 1-N descending there from. Assume also that a first request to Operation 1 adds 50 tokens to the Operation 1 bucket, and that a second request to Operation 3 attempts to add 75 tokens to the Operation 3 bucket. If the second request arrives within the same time period as the first, the second request will be rejected, even though it does not exceed the rate limit assigned to Operation 3. This is because the combined rate of the requests made to Operations 1 and 3 (i.e., 125 tokens per second) exceeds the rate limit imposed on Service 1 (i.e., the parent node).

FIG. 4 illustrates another way in which rate limits may be distributed within a "rate limit tree" and bucket contents may be tracked within a "rate limiter bucket tree." For example, rate limits may be distributed/tracked at a requester level, in addition to the global, service and operation levels described above. As used herein, a "requester" is defined as a client or user requesting access to a particular service or application provided by the cluster. In some cases, the tree structure shown in FIG. 4 may be used to extend admission control concepts to include distributed enforcement of Service Level Agreements (SLAs).

A service level agreement is a contract between a network service provider and a customer that specifies, usually in measurable terms, what services the network service provider will furnish. Many Internet service providers (ISPs) provide their customers with an SLA. In addition to other metrics, SLAs may provide guaranteed levels of service on the number of users (i.e., requesters) that can access the service simultaneously, as well as service uptime, latency, restoral time per failure, packet loss, etc. In order to provide guaranteed levels of service, many SLAs specify service and/or operation rate limits per requester. The SLA limits are typically policy driven, not purely provisioned, and must be dynamically updatable.

Policies governing SLA limits are usually stored in a policy database, which is made accessible to the system during message processing. Due to the large number of requesters having access to a service, SLA rate information was previously made available only in a localized fashion with each message. For example, SLA rate limits were often retrieved from the policy database at the time of message processing. Thus, limit information was not made available prior to message processing, nor was it made available to individual members of a cluster. As described in more detail below, the admission control algorithm for SLA enforcement described herein improves upon prior art methods by providing a-priori knowledge of SLA rate limits to at least a subset of the cluster members.

It is worth noting that only a few examples of hierarchical rate limiting have been illustrated and described herein. The inventive concepts are not limited to only those tree structures shown in FIGS. 3-4. In addition to the tree structures specifically shown, rate limits may be distributed among different numbers and/or types of levels. However, it should be noted that reservation estimation becomes more and more expensive to perform accurately as the number of levels and, thus, the number of leaves in the tree expands.

Method for Distributed Admission Control/SLA Enforcement:

The admission control algorithm described herein improves upon the basic rate limiter bucket algorithm by providing a method that can be used in a clustered environment. To do so, the improved admission control algorithm utilizes many key features of a high availability framework including group membership, coordinator election and inter-group messaging (among others). As noted above, one member of the cluster is elected "reservation coordinator." In most cases, no restrictions are placed on coordinator election; any member of the cluster may be elected coordinator. If the coordinator fails for any reason, a message is sent out to the remaining cluster members (via inter-group messaging) for resetting their state and restarting the admission control algorithm.

In some cases, the reservation coordinator maintains a rate limit tree for the entire cluster (referred to as a "cluster tree"), and a separate rate limit tree for each member of the cluster (referred to as "member trees"). The cluster tree is used for tracking rate limits and consumption across all members of the cluster. Member trees are used for comparing a particular member's allocated rate limits against the cluster limits. For example, the rate limits specified for each node of a member tree will correspond to some share of the rate limits specified in the cluster tree. Member consumption is tracked within the local rate limiter bucket trees stored within each cluster member.

Because any member may be elected coordinator, rate limit information must be accessible to each member of the cluster. In some embodiments, the cluster tree may also be stored locally within each and every cluster member. This enables any member to gain immediate access to the cluster limits, should the current coordinator go down. However, maintaining multiple copies of the cluster tree has the disadvantage of increased memory consumption and inter-group messaging (which consumes network bandwidth). Therefore, it may be desirable to provide rate limit information to cluster members in other ways.

In one example, the cluster tree could be stored locally on only a small subset of cluster members. In this case, memory and inter-group messaging may be reduced by not having to send the cluster tree information out to all members of the cluster. In another example, the cluster tree could be stored within a separate configuration database. The appropriate rate limit information could then be piggybacked along with each reservation request sent to the reservation coordinator. The latter example allows the reservation coordinator to discover the cluster limits, and allows for easy dynamic discovery of new, updated limits. If the limit information is piggybacked with each reservation request, the reservation coordinator could forget any section of the cluster tree where a node's consumption is zero (and thus, it's children are zero), thereby allowing for easy clean up of empty nodes and memory savings. The cluster tree structure could then be "rediscovered" during subsequent reservation requests.

When a cluster member wishes to use more rate (i.e., to satisfy a client request), the member sends a "reservation request" to the reservation coordinator asking for an additional "reservation amount." The reservation coordinator compares the additional reservation amount against the global limit for the cluster and decides whether or not to allow the reservation request. The reservation request may be allowed if the additional reservation amount falls within the specified limits. Otherwise, the reservation request is rejected with a reservation amount of zero. Failover is handled using a simple mechanism: each reservation request has an associated time period. If a "keep alive" is not sent within the time period, the reservation is removed.

Figure 5:
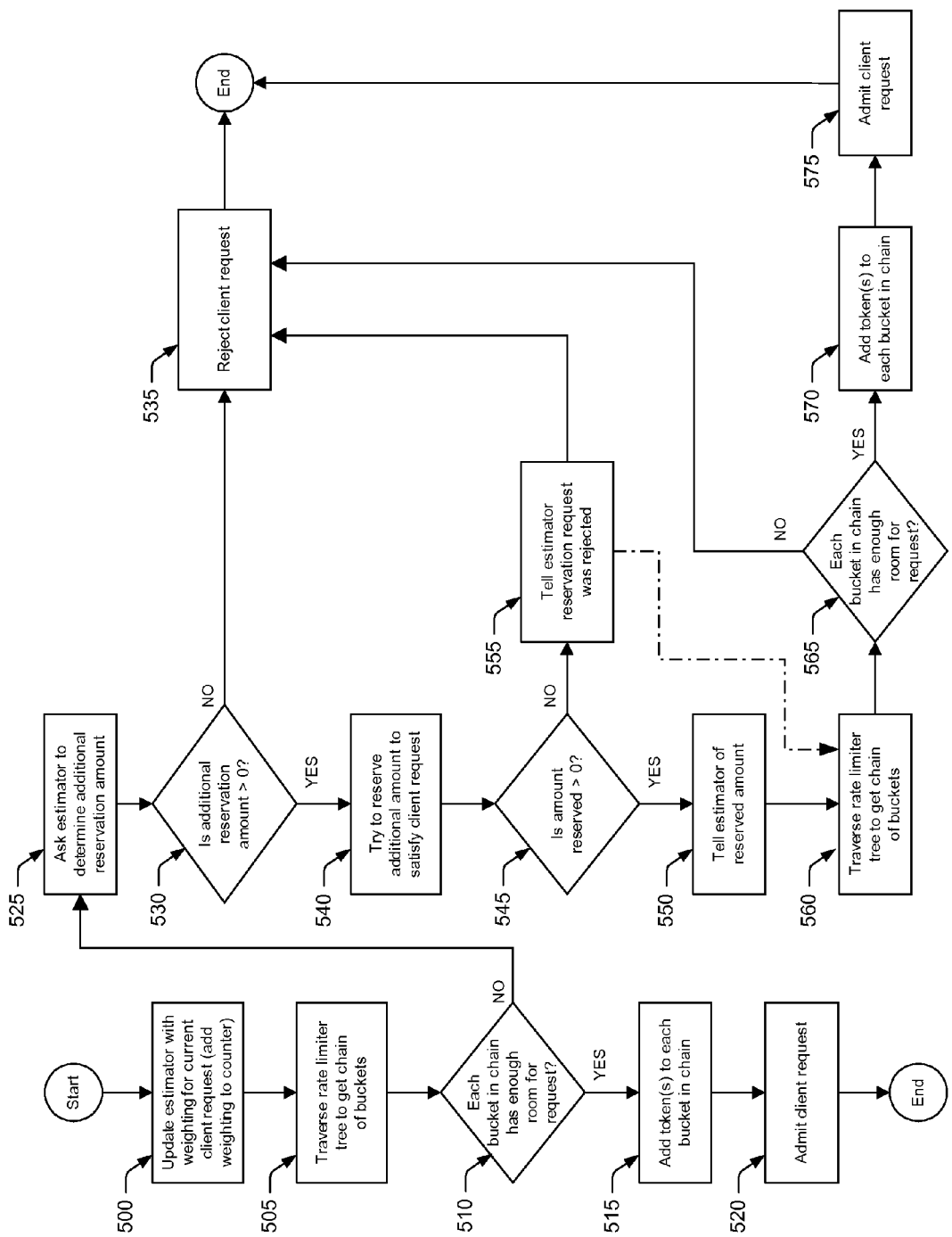
FIG. 5 is a flow chart diagram illustrating one embodiment of an improved admission control algorithm that may be used for processing a request.

A flow chart diagram illustrating one embodiment of an improved admission control algorithm is shown in FIG. 5. When deciding whether or not to admit a client request, the improved admission control algorithm compares a cluster member's current rate consumption (stored locally within a rate limiter bucket tree) with the rate limits specified in that member's rate limit tree (stored within the reservation coordinator). More specifically, the algorithm traverses a path between the global rate bucket and one of the child node buckets included within the cluster member's rate limiter bucket tree. If there is enough room to add the request token (s) to each bucket along the traversed path, the request is admitted. Otherwise, the estimator is called to determine whether or not additional rate capacity can be reserved to satisfy the client request. Additional rate capacity may be awarded to the requesting member if sufficient rate is available in the cluster tree.

In some cases, the admission control algorithm shown in FIG. 5 may use one of the rate limit (or rate limiter bucket) trees shown in FIGS. 3 and 4 to determine whether or not a client request can be admitted. As such, the admission control algorithm may be used to implement general admission control procedures, or to enforce rate limits specified in a Service Level Agreement. As noted above, alternative tree structures not specifically shown herein may also be used by the admission control algorithm.

As shown in FIG. 5, the admission control/SLA algorithm may begin by updating the estimator with the weighting specified for the current client request (step 500). In other words, the estimator keeps a "moving average," or count of the number of tokens consumed by each cluster member during each time period. In most cases, a period may be defined as one second, so that the count will correspond to the current rate consumption (specified in tokens per second) for the cluster member. Because a client request can consume more than one token, the weight of the client request (i.e., the number of tokens consumed by the request) is added to the estimator's counter to update the current rate consumption. The current rate consumption will be used later on to determine if rate capacity should be released back into the cluster.

Once the weight of the client request is added to the counter, the algorithm traverses the rate limiter bucket tree stored within the cluster member responsible for processing the request (step 505). For example, if a request is made to Operation 1, the algorithm recovers the chain of buckets arranged along the path extending from the Global bucket to the Operation 1 bucket (e.g., Global→Service 1→Operation 1 in the rate limiter bucket tree of FIG. 3). Next, the algorithm determines whether or not each chain in the bucket has enough room to satisfy the request (step 510). If enough room exists (i.e., if adding the tokens would not exceed the rate limit imposed at any level in the chain), the tokens are added to each bucket in the chain (step 515), the request is admitted (step 520) and the algorithm ends.

If there is not room within each bucket to admit the request, the estimator is called to determine whether additional rate capacity can be reserved to ultimately satisfy the request (step 525). FIG. 6 illustrates one manner in which the estimator may be used to determine the additional reservation amount. Other methods for determining the additional reservation amount are possible and should be considered to fall within the ordinary scope of the invention.

As shown in FIG. 6, the estimator may begin by calculating the amount of elapsed time between the current time and the beginning of the last silence period (step 600). As used herein, the "silence period" may be defined as a predetermined time period after a reservation rejection in which subsequent reservation requests are suppressed. The "silence period" begins once a reservation request (i.e., a request for additional rate capacity) is rejected. The silence period is used to avoid overloading the reservation coordinator with repeated reservation requests and rejects. In other words, the estimator implements suppression of request rates to keep the members from sending additional reservation requests when there is no possibility of reserving more rate. Without suppression, message chunking would also cease to work.

Next, the estimator determines whether the elapsed time is less than the silence period (step 610). If the elapsed time falls within the silence period, the estimator rejects the reservation request and returns a reservation amount of zero (step 620). Otherwise, the estimator accepts the reservation request and returns a reservation chunk amount (step 630). The reservation chunk amount is a tunable parameter in the estimation algorithm. For instance, the reservation chunk amount may be increased to increase reservation speed and reduce inter-group messaging, or decreased to increase estimation accuracy when operating near rate limits.

Returning to FIG. 5, the reservation chunk amount provided by the estimator is applied to the admission control/SLA algorithm (step 530). If the reservation chunk amount is zero, the client request is rejected (step 535) and the algorithm ends. As noted above, a reservation chunk amount of zero may be returned if the elapsed time falls within the silence period. Other reasons for returning a zero reservation chunk amount may exist. For example, if a maximum reservation amount is specified for each member, a zero reservation amount may be returned if a requesting member has already exceeded (or will exceed) its allocated amount.

If the reservation chunk amount is greater than zero (in step 530), the cluster member may send a reservation request to the reservation coordinator to ask for more rate (step 540). The reservation request may be granted if there is enough rate capacity within the cluster to satisfy the reservation request. For example, the reservation coordinator may compare the current rate consumption of all cluster members (stored within the member trees) to the rate limits stored within the cluster tree. If the additional rate capacity asked for by the cluster member causes the combined reservation capacity of all members to exceed the reservation amounts specified in the cluster tree, the reservation coordinator rejects the reservation request and returns a reservation amount of zero. Otherwise, the reservation coordinator accepts the reservation request and returns a reservation amount equal to: i) the reservation chunk size, or ii) some new amount greater than zero, but less than the reservation chunk size. For example, the "new amount" may be less than the reservation chunk size if not enough rate capacity is left to satisfy the chunk request. As noted above, the reservation chunk size is a tunable parameter in the estimator algorithm.

Next, the estimator is updated to account for the acceptance or rejection of the reservation request. For example, if the reservation coordinator is able to reserve additional rate capacity (in step 545), the coordinator sends the newly reserved amount to the estimator (in step 550), so that the estimator can update its counter with the newly reserved amount. The counter is updated by adding the "new amount" to the amount currently reserved by the cluster member. As noted above, the "new amount" may be: i) equal to the reservation chunk size, or ii) less than the reservation chunk size if insufficient rate capacity is left within the cluster.

Once the estimator's counter is updated with the new reservation amount (step 550), the rate limiter bucket tree for the cluster member (who requested the additional rate capacity) is traversed yet again to get the chain of buckets (step 560). Following the example provided above, a client request made to Operation 1 causes the cluster member to return the chain of buckets extending from the Global bucket to the Operation 1 bucket (i.e., Global→Service 1→Operation 1, as shown in FIG. 3). These buckets previously had insufficient room to satisfy the client request. However, because the reservation coordinator may have been able to allocate additional rate to the chain of buckets, the algorithm again asks whether or not there is enough room in each bucket to satisfy the request (step 565). If enough room exists, the request token(s) are added to each bucket in the chain (step 570), the client request is admitted (step 575) and the algorithm ends. Otherwise, the client request is rejected (step 535) and the algorithm ends.

The client request may also be rejected (in step 535) if the reservation coordinator is unable to reserve additional rate capacity for the cluster member (in steps 540 and 545). If this occurs, the coordinator tells the estimator that the reservation request was rejected (in step 555), so that the last silence time may be set to the current time, thereby resetting the silence period. In some embodiments, the algorithm may end after updating the estimator (step 555) and rejecting the reservation request (step 535). However, space may have been cleared in the chain of buckets during the time it takes to run the reservation software. For example, the bucket contents may have been cleared at the end of the time interval (e.g., one second), making room for additional tokens. For this reason, the algorithm may divert program control to step 560, in other embodiments of the invention, after telling the estimator of the rejected reservation request. This would provide the cluster member another shot at traversing a potentially updated rate limiter bucket tree, one which may now have room to add the request token(s) and admit the request.

As noted above, the estimator software performs a continual, real-time capacity estimation for each member of the cluster. This enables the estimator to determine when to ask the coordinator for additional rate capacity, and when to release rate capacity back into the cluster. Releasing rate capacity from one cluster member enables the rate to be redistributed to other cluster members who may require additional capacity. As described below in reference to FIG. 7, rate capacity may be released from one cluster member if the "current rate consumption trend" is steady or decreasing, and the member has more reserved rate than it is currently using.

FIG. 7 illustrates one manner in which the estimator may be used to determine when to release rate capacity back into the cluster for redistribution. Other methods for releasing rate capacity are possible and should be considered to fall within the ordinary scope of the invention. As shown in FIG. 7, the estimator may begin by updating the "moving average," or count of the number of tokens consumed by a particular cluster member during the current time period (step 700). As noted above, the moving average is updated by adding the admitted request tokens to the estimator's counter. The counter is reset at the end of the current time period (step 710) and the current moving average is compared to the "last value average," or count of the number of tokens consumed by the cluster member during the last time period (step 720). Depending on the outcome of the comparison, the "current rate consumption trend" may be set to increasing (step 730A), steady (step 730B) or decreasing (step 730C).

Next, the estimator determines whether or not to release rate capacity back into the cluster. For example, the estimator may access the rate limiter bucket tree (stored within the cluster member) to determine the current reservation amount for the cluster member. If the current reservation amount is equal to zero (in step 740), the cluster member has no rate to release, and the estimator waits until the next time period (step 750) to restart the method and potentially release rate.

If the current reservation amount is greater than zero (in step 740), the estimator bases the next step on whether or not the "current rate consumption trend" is increasing, steady or decreasing. If the trend is increasing ("no" branches in steps 760 and 770), the estimator realizes that the cluster member may need his current reservation amount (or even more capacity) to satisfy incoming client requests. Thus, an increasing trend also causes the estimator to wait until the next time period (step 750) to potentially release rate. However, if the trend is decreasing or steady ("yes" branches in steps 760 and 770), the estimator calculates the difference between the member's current reservation amount and its moving average (step 780). If the difference is greater than the release chunk size, a chunk of that member's reserved capacity is released back into the cluster (step 790). Otherwise, the estimator waits until the next time period (step 750) to release rate.

Like the reservation chunk size, the release chunk size is a tunable parameter in the estimation algorithm. The release chunk size may be similar to, or different than, the reservation chunk size. In some cases, the reservation and release chunk sizes may be specified as some percentage of the rate limits set for the entire cluster. In other cases, the reservation and release chunk sizes may be set to any appropriate size. It is worth noting that rate capacity may not always be reserved and released in chunks. When used, chunking increases reservation/release speed and cuts down on inter-group messaging, thereby reducing network bandwidth on the communication paths between cluster members. However, because chunking decreases accuracy when near the rate limits, the trade-off between accuracy and speed should be considered when determining reservation and release chunk sizes.

In some embodiments, the estimator may be assigned to each Operation within the rate limiter bucket tree. This enables the estimator to estimate rate consumption all the way down to the leaf nodes. In other embodiments, the estimator may be assigned to the nodes within a higher level of the rate limiter bucket tree. For example, the estimator may be assigned only to those nodes residing at the requester level shown in FIG. 4. This approach may be taken, e.g., due to the large number of requesters (and thus, large number of client requests) requesting access to applications and services protected by a Service Level Agreement. It should be noted that estimation can be performed at any level in the tree. However, a trade-off exists in that estimation at the leaf nodes provides greater accuracy, while estimation at higher nodes consumes less memory and computational resources.

Method for Distributed Traffic Shaping:

As noted above, the Token Bucket and Leaky Bucket are two algorithms that are commonly used to perform traffic shaping. The Token Bucket algorithm controls the amount of data that is injected into a network by imposing a limit on the average data transmission rate. In other words, the Token Bucket algorithm allows "bursts" of data to be sent (up to its peak burst rate), if there are adequate tokens in the bucket and the burst threshold is configured properly. The Leaky Bucket algorithm differs from the Token Bucket by imposing a hard limit on the data transmission rate. In other words, the Leaky Bucket algorithm smoothes bursty traffic by constraining packets to filter out of the "leaky" bucket at a constant rate. The filtering provided by the leaky bucket imposes a hard limit on the data transmission rate by enforcing space between packets.

Although appropriate for some networks, the prior art Token Bucket and Leaky Bucket algorithms are not applicable to clustered environments. For example, the prior art algorithms maintain only one bucket per network resource for the entire cluster. The prior art algorithms provide absolutely no means for distributing bucket contents among cluster members to account for changes in burst allocation. The prior art algorithms also fail to provide a means for monitoring and controlling the distribution of burst allocation, and therefore, cannot be used to protect network resources when burst allocations change (e.g., when one or more cluster members fail or are taken off-line).

To overcome the disadvantages mentioned above, the basic Token Bucket algorithm has been expanded to support traffic shaping in a clustered environment. For example, each member of the cluster is given their own queued or non-queued token bucket for a particular network resource. Any network service (e.g., a call control server) may be considered a resource. As shown in FIG. 8, each member of the cluster maintains one or more network resource buckets (e.g., Buckets R1-R3), depending on the number of resources (e.g., Resources 1-3) used by, or made available to, the cluster as a whole. The network resource buckets are stored locally within each member of the cluster.

The improved traffic shaping algorithm is similar to the improved admission control algorithm, in that each utilizes a reservation coordinator and estimator for reserving and releasing rate. In addition to reserving rate, the reservation coordinator is responsible for proportioning burst allocation among members of the cluster in the traffic shaping algorithm. In some embodiments, a conservative approach to burst allocation may be taken. For example, the initial burst allocation may be divided up evenly among members of the cluster. In other embodiments, the initial burst allocation may be divided somewhat unevenly among cluster members, in accordance with some predetermined weighting. This may provide larger, more power machines more burst allocation than smaller, less capable machines. Note, however, that burst allocation may only be divided among active members of the cluster. If a member of the cluster should fail, or be taken off-line, the burst allocation is redistributed by the reservation coordinator, so that the total burst output for the cluster remains constant.

In some cases, the burst allocation may be chosen such that the total burst output for the cluster divided by the maximum burst allocation for any cluster member is greater than or equal to the largest request weight (recall: request weighting allows requests to consume more than one token). This ensures that each request will pass, or there will be insufficient tokens in the bucket to pass the request. The maximum burst allocation corresponds to the size of (i.e., the rate limit imposed on) the local bucket for any cluster member. Since burst allocations are asynchronous, the rate limits imposed on each bucket may change at any time.

An estimator is assigned to each resource tracked by a "local token bucket" (i.e., a token bucket stored for that resource within a cluster member). In the traffic shaping algorithm, the estimator tries to determine how much average rate to reserve or release within the cluster. To cut down on inter-group messaging, reservations are requested and released in chunks, which is a tunable parameter to the estimation algorithm. The estimator keeps track of a "moving average" of the number of tokens consumed during the current period, and a derivative of the current period versus the prior period. The derivative is an important element to provide robustness against rate fluctuations.

Figure 10:
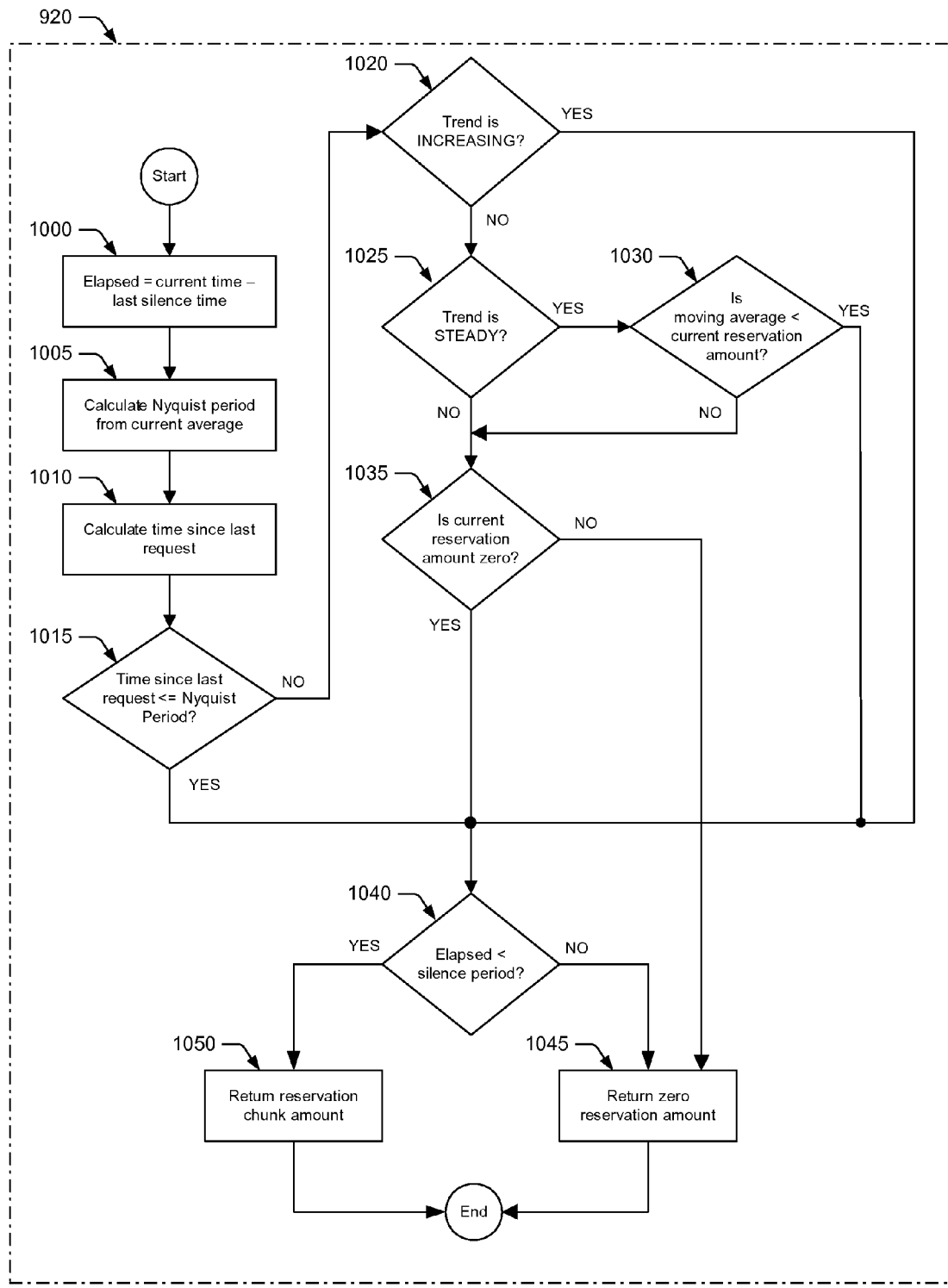
FIG. 10 is a flow chart diagram illustrating one manner in which an estimation algorithm may be used to determine when to reserve additional rate capacity in the traffic shaping algorithm of FIG. 9.
Figure 11:
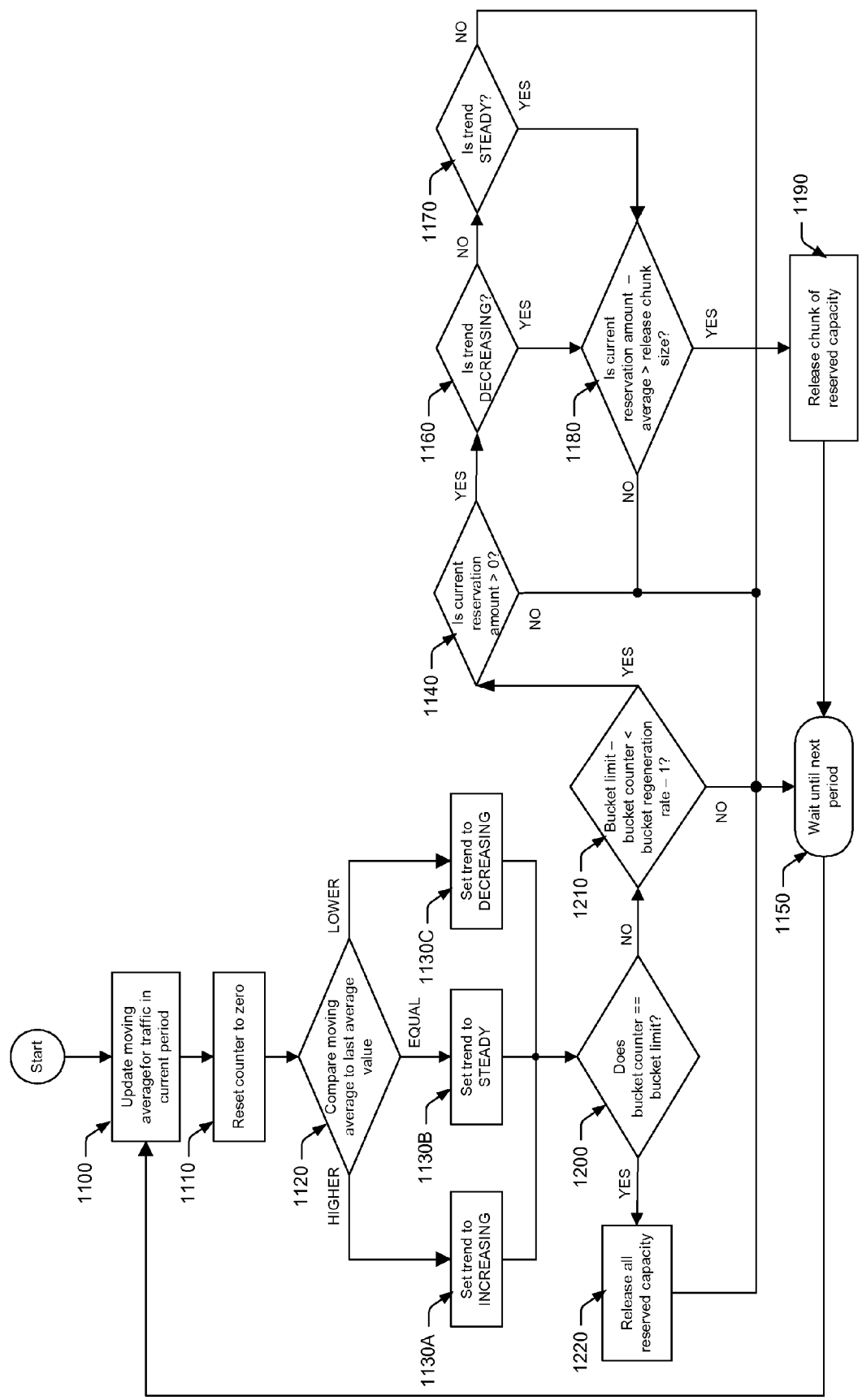
FIG. 11 is a flow chart diagram illustrating one manner in which an estimation algorithm may be used to determine when to release rate capacity in the traffic shaping algorithm of FIG. 9.

As described in more detail below, the traffic shaping algorithm differs from the admission control algorithm in: i) when the estimator is called and ii) when to release capacity. For example, the estimation algorithm described below should be called for every single request, regardless of whether the request is admitted or rejected. This is due to the fact that token buckets actively regenerate burst, therefore it is desirable to regenerate burst as quickly as possible by consuming tokens at each and every request. Likewise, capacity should only be released once a bucket has reached its maximum rate limit, thereby providing maximum local burst capability and indicating that the rate is truly excessive. The improved traffic shaping algorithm, according to one embodiment of the invention, is illustrated in FIGS. 9-11.

Figure 9:
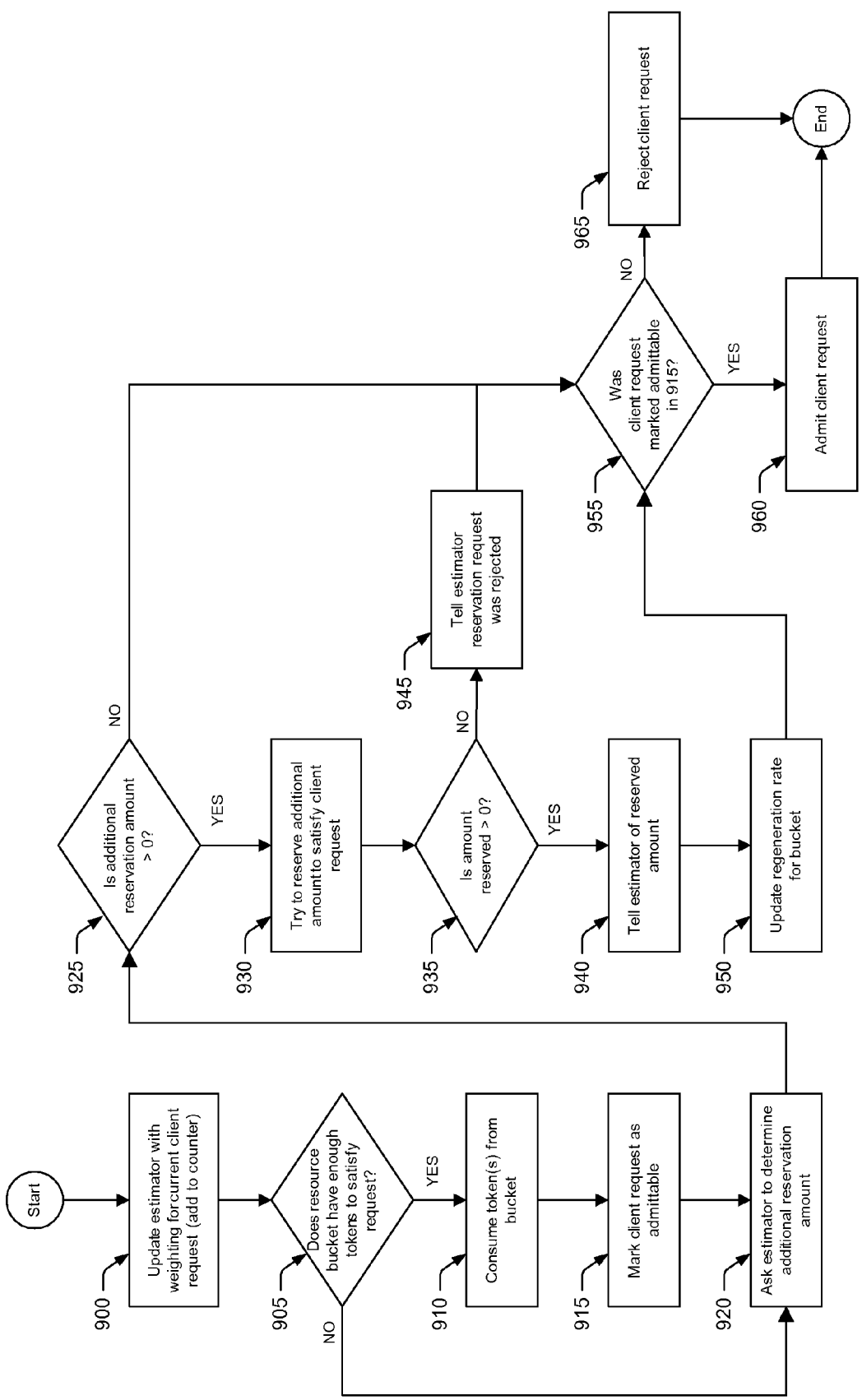
FIG. 9 is a flow chart diagram illustrating one embodiment of an improved traffic shaping algorithm that may be used for processing a request.

FIG. 9 illustrates one embodiment of a traffic shaping algorithm that may be used for processing a client request. Similar to the prior art Token Bucket algorithm, a "token" is added to a local token bucket every 1/r seconds. The constant refilling of tokens is referred to herein as the "local token regeneration rate." A local token bucket may contain at most b tokens; if the bucket is full when the token arrives, it is discarded. When a request corresponding to n tokens arrives, n tokens are removed from the bucket and the request is marked as admittable. If fewer than n tokens are available, no tokens are removed from the bucket.

Unlike the prior art algorithm, the traffic shaping algorithm described herein monitors and controls rate capacity and burst allocation, which is dynamically distributed among members of the cluster. For example, rate capacity may be distributed, such that the sum of each member's rate is equal to the global rate limit imposed on the entire cluster. Burst allocation may be distributed in a similar manner; the sum of each bucket's burst is equal to the total burst output for the entire cluster.

In addition, the improved traffic shaping algorithm uses an estimator for estimating when to reserve or release rate capacity. As indicated above, the estimator may be called after each request regardless of whether or not that request was successful. For example, when a request arrives, a counter within the estimator is updated with the weighting specified for the current client request (step 900). In other words, the estimator keeps a "moving average," or count of the number of tokens consumed by each local token bucket during each time period. In most cases, a period may be defined as one second, so that the moving average will correspond to the current rate consumption (specified in tokens per second) for that bucket. Because a client request can consume more than one token, the weight of the client request (i.e., the number of tokens consumed by the request) is added to the estimator's counter to update the current rate consumption. The current rate consumption will be used later on to determine if rate capacity should be released back into the cluster.

Once the weight of the client request is added to the counter, the algorithm determines whether a local token bucket for a particular resource has enough tokens to satisfy the request (step 905). If enough tokens remain, the number of tokens needed to satisfy the request are removed from the bucket (step 910) and the request is marked "admittable" (step 915).

Upon receipt of the first request that begins depleting the token bucket, the estimator is called to attempt to reserve rate and try to refill the local token bucket (step 920). As noted above, rate is proportioned to each member of the cluster according to the traffic output distribution, such that the sum of the rate for each cluster member is equal to the maximum average sustained rate for the entire cluster. The proportioned, or reserved, rate for each member of the cluster corresponds to the local token regeneration rate. Note that this approach mathematically equals a single token bucket. For example, if the combined burst consumption of all members [sum(members_b_i)] equals B (i.e., the total burst output for the entire cluster) and the combined local token regeneration rate of all members [sum(members_r_i)] equals R (i.e., the token regeneration rate for the entire cluster), then the maximum number of requests admitted through the cluster during any given time period, t, will be bounded by a single token bucket of B+Rt.

FIG. 10 illustrates one manner in which the estimator may be used to determine an additional reservation amount (step 920 in FIG. 9). Other methods for determining the additional reservation amount are possible and should be considered to fall within the ordinary scope of the invention.

As shown in FIG. 10, the estimator may begin by calculating the amount of elapsed time between the current time and the beginning of the last silence period (step 1000). As noted above, the "silence period" is defined as a predetermined time period after a reservation rejection in which subsequent reservation requests are suppressed. The "silence period" begins once a reservation request (i.e., a request for additional rate capacity) is rejected. The silence period is used to enable message chunking and avoid overloading the reservation coordinator with repeated reservation requests and rejects.

Next, the estimator detects whether or not the request was sent in a "burst" of data by calculating the Nyquist rate (step 1005) and the time since the last request (step 1010). The Nyquist rate is calculated by dividing the current moving average in half. Next, the estimator determines if the time since the last request is less than or equal to the Nyquist period (step 1015). If the time since the last request is less than or equal to the Nyquist period (indicating no burst), the estimator returns the appropriate reservation chunk amount by comparing the elapsed time to the silence period, as shown in steps 1040, 1045 and 1050. This method is equivalent to the method steps described above in steps 610, 620 and 630 of FIG. 6.

If the time since the last request is greater than the Nyquist period (indicating that a burst has occurred), the estimator determines whether the current moving average is increasing, steady or decreasing (see FIG. 11). The estimator attempts to reserve additional rate if: i) the trend is increasing (step 1020), ii) the trend is steady, but the current moving average is greater than the current reservation amount (steps 1025, 1030), or iii) the trend is steady or decreasing, but the current reservation amount is zero (steps 1025, 1030, 1035). The estimator attempts to reserve additional rate by comparing the elapsed time to the silence period (steps 1040, 1045 and 1050) and returning the appropriate reservation chunk amount. However, if the estimator determines that the trend is steady or decreasing (step 1025) and the current reservation amount is greater than zero (step 1035), the estimator forgets about the silence period and simply returns a zero reservation chunk amount. This is due to the fact that there is probably no need to reserve additional rate if the trend is steady or decreasing and you have enough rate already.

As indicated above, the reservation chunk size (and release chunk size) may be a tunable parameter in the estimation algorithm. However, rate capacity may not always be reserved and released in chunks. When used, chunking increases reservation/release speed and cuts down on intergroup messaging, thereby reducing network bandwidth on the communication paths between cluster members. Because chunking decreases accuracy when near the rate limits, the trade-off between accuracy and speed should be considered when determining reservation and release chunk sizes.

Returning to FIG. 9, the reservation chunk amount provided by the estimator is applied to the traffic shaping algorithm. If the reservation chunk amount is zero (in step 925), the traffic shaping algorithm determines (in step 955) whether the request was previously marked as being admittable. If the request was marked admittable, the client request is accepted (step 960). Otherwise, the client request is rejected (step 965) and the algorithm ends.

If the reservation chunk amount is greater than zero (in step 925), the cluster member may send a reservation request to the reservation coordinator to ask for more rate (step 930). The reservation request may be granted if there is enough rate capacity within the cluster to satisfy the reservation request. For example, the reservation coordinator may compare the current rate consumption of all cluster members (stored within the local token buckets) to the maximum average sustained rate for the entire cluster. If the additional rate capacity asked for by the cluster member causes the combined reservation capacity of all members to exceed the maximum average sustained rate, the reservation coordinator rejects the reservation request and returns a reservation amount of zero. Otherwise, the reservation coordinator accepts the reservation request and returns a reservation amount equal to: i) the reservation chunk size, or ii) some new amount greater than zero, but less than the reservation chunk size. For example, the "new amount" may be less than the reservation chunk size if not enough rate capacity is left to satisfy the chunk request. As noted above, the reservation chunk size is a tunable parameter in the estimator algorithm.

Next, the estimator is updated to account for the acceptance or rejection of the reservation request. For example, if the reservation coordinator was able to reserve additional rate capacity (in steps 930 and 935), the coordinator sends the newly reserved amount to the estimator (in step 940), so that the estimator can update its counter with the newly reserved amount. The counter is updated by adding the "new amount" to the amount currently reserved by the cluster member. As noted above, the "new amount" may be: i) equal to the reservation chunk size, or ii) less than the reservation chunk size if insufficient rate capacity is left within the cluster. The local token bucket regeneration rate is then updated to account for the additional rate capacity (step 950). If the reservation coordinator is unable to reserve additional rate capacity for the cluster member (in steps 930 and 935), the coordinator tells the estimator that the reservation request was rejected (in step 945). This allows the silence period to be reset by setting the last silence time to the current time. Once the estimator is updated (steps 940 or 945), the algorithm determines whether the client request was previously marked as being admittable (step 955). If the request was marked admittable, the client request is accepted (step 960). Otherwise, the client request is rejected (step 965) and the algorithm ends.

Like the admission control algorithm provided above, the estimator used within the traffic shaping algorithm performs a continual, real-time capacity estimation for each member of the cluster. This enables the estimator to determine when to ask the reservation coordinator for additional rate capacity, and when to release rate capacity back into the cluster. Releasing rate capacity from one cluster member enables the rate to be redistributed to other cluster members who may require additional capacity. As described below in reference to FIG. 11, rate capacity may be released from one cluster member if the "current rate consumption trend" is steady or decreasing, and the member has more reserved rate than it is currently using.

FIG. 11 illustrates one manner in which the estimator may be used to determine when to release rate capacity back into the cluster for redistribution. Several of the method steps shown in FIG. 11 are similar to the ones shown in FIG. 7 and described in detail above. These steps are depicted with similar reference numerals throughout FIGS. 7 and 11. For the sake of brevity, method steps common to both FIGS. 7 and 11 will not be discussed in more detail below. Reference can be made to the description provided above to gain full understanding of the method shown in FIG. 11. It is also understood that other methods for releasing rate capacity are possible and should be considered to fall within the ordinary scope of the invention.

As shown in FIG. 11, the estimator may begin by updating the moving average for the current period (step 1000) and resetting the counter to zero (step 1110). Next, the estimator may compare the "current moving average" to the "last value average" (step 1120) to determine the "current rate consumption trend" (step 1130). As noted above, the trend may be set to increasing (step 1130A), steady (step 1130B) or decreasing (step 1130C). In some embodiments, the estimator may use the method described above in FIG. 7 (and shown in steps 1140-1190 of FIG. 11) to determine when to release rate capacity back into the cluster. For example, the estimator may use the previously described method if: i) the bucket counter does not equal the bucket limit (step 1200), and ii) the bucket limit minus the bucket counter is less than the local token bucket regeneration rate minus 1 (step 1210). As noted above, the previously described method either releases a chunk of reserved capacity or waits until the next time period to (potentially) release rate.

As noted above, the "bucket limit" is equivalent to the local token regeneration rate assigned to a particular cluster member. The "bucket counter" tracks the number of tokens consumed by each local token bucket during each time period. Comparing the difference between the bucket limit and the bucket counter to the local token bucket regeneration rate minus 1 (step 1210), enables the estimator to determine when a particular token bucket is nearing its maximum rate limit (i.e., max burst allocation). Nearing a maximum rate limit signals the estimator that it may be time to release some (if not all) of that member's local token bucket rate capacity.

However, the estimation method for releasing rate capacity may sometimes differ in the traffic shaping embodiment. For instance, if the bucket counter equals the bucket limit (step 1200), the estimator releases all reserved capacity back into the cluster (step 1220). This is typically done to handle bursty transmissions. On the other hand, the estimator may wait until the next period to release rate if: i) the bucket counter does not equal the bucket limit (step 1200), and ii) the bucket limit minus the bucket counter is greater than or equal to the local token bucket regeneration rate minus 1 (step 1210). In other words, the estimator may wait to release rate in steady state cases, which consume bucket contents gradually (unlike bursts of data, which quickly consume bucket contents).

It will be appreciated by those skilled in the art having the benefit of this disclosure that this invention is believed to provide improved algorithms for implementing admission control and traffic shaping procedures in a clustered environment. The algorithms described herein improve upon prior art techniques by providing unique means for monitoring and controlling the distribution of rate limits and bucket contents among members of a cluster. This enables the algorithms to adapt to changes in rate distributions (for admission control) and burst allocation (for traffic shaping). For example, if the rate distribution to the cluster changes (but does not exceed a global rate limit), the improved admission control algorithm described herein allows rate to be re-proportioned among members of the cluster according to the new distribution. The improved traffic shaping algorithm uses a similar approach for redistributing burst allocation between active cluster members, should one or more cluster members fail or be taken off-line. Further modifications and alternative embodiments of various aspects of the invention will be apparent to those skilled in the art in view of this description. It is intended, therefore, that the following claims be interpreted to embrace all such modifications and changes and, accordingly, the specification and drawings are to be regarded in an illustrative rather than a restrictive sense.

What is claimed is:

1. A network cluster comprising a plurality of cluster members, wherein each member of the cluster comprises:

a first database containing a hierarchical tree structure for tracking a current rate consumption of that cluster member, wherein the hierarchical tree structure stored within the first database comprises a plurality of levels, a plurality of nodes, and at least one branch, wherein a single one of the nodes is a root node occupying a highest level of the tree structure, wherein a given branch connects a parent node in a given level to a child node in a level directly below the given level, and wherein each node of the tree structure comprises a bucket configured for accepting tokens up to a maximum rate limit, which is specified for that bucket as a maximum number of tokens added per time period, said cluster member having a workload shared across said plurality of cluster members and configured for running common applications and used to provide key databases, file sharing, business applications and consumer services;

a first set of computer-executable instructions for controlling the admission of client requests sent to that cluster member, a second set of computer-executable instructions for receiving a client request for a service or operation provided by one of the cluster members, the client request having a weight assigned thereto;

a third set of computer-executable instructions for accessing the tree structure stored within the first database of the cluster member receiving the client request;

a fourth set of computer-executable instructions for traversing the tree structure to get a chain of buckets descending from the root node to a child node corresponding to the requested service or operation;

a fifth set of computer-executable instructions for admitting the client request, if a number of tokens equal to the weight of the client request can be added to each bucket within the chain of buckets without exceeding the maximum rate limit specified for any bucket in the chain; and a sixth set of computer-executable instructions for attempting to reserve additional rate capacity to satisfy the client request, if adding the number of tokens causes any bucket within the chain of buckets to exceed its maximum rate limit for that time period.

2. The network cluster as recited in claim 1, wherein the sixth set of computer-executable instructions comprise:

a seventh set of computer-executable instructions for sending a reservation request to ask for the additional rate capacity;

an eighth set of computer-executable instructions for updating the tree structure with a non-zero reservation amount if: (a) the reservation request is not sent within a designated silence period, and (b) sufficient rate capacity remains within the cluster to satisfy the reservation request; and a ninth set of computer-executable instructions for traversing the updated tree structure to get a new chain of buckets descending from the root node to a child node corresponding to the requested service or operation.

3. The method as recited in claim 2, wherein following the ninth set of computer-executable instructions, the first set of computer-executable instructions further comprises:

a tenth set of computer-executable instructions for admitting the client request, if the number of tokens can be added to each bucket within the new chain of buckets without exceeding the maximum rate specified for any bucket in the chain; and an eleventh set of computer-executable instructions for rejecting the client request, if adding the number of tokens causes any bucket within the new chain of buckets to exceed its maximum rate for that time period.

4. A method for controlling the admission of client requests sent to a cluster having a plurality of cluster members, the method comprising:

receiving a client request for a service or operation provided by one of the cluster members, said one of the cluster members configured for running common applications and having a workload shared across said plurality of cluster members and used to provide key databases, file sharing, business applications and consumer services, the client request having a weight assigned thereto:

accessing a tree structure stored within the one cluster member, the tree structure comprising a plurality of levels, a plurality of nodes, and at least one branch, wherein a single one of the nodes is a root node occupying a highest level of the tree structure, wherein a given branch connects a parent node in a given level to a child node in a level directly below the given level, and wherein each node of the tree structure comprises a bucket configured for accepting tokens up to a maximum rate limit, which is specified for that bucket as a maximum number of tokens added per time period;

traversing the tree structure to get a chain of buckets descending from the root node to a child node corresponding to the requested service or operation; and admitting the client request, if a number of tokens equal to the weight of the client request can be added to each bucket within the chain of buckets without exceeding the maximum rate limit specified for any bucket in the chain;

attempting to reserve additional rate capacity to satisfy the client request, if adding the number of tokens causes any bucket within the chain of buckets to exceed its maximum rate for that time period, wherein the step of attempting to reserve additional rate capacity comprises:

sending a reservation request to an estimation algorithm configured for determining when to satisfy a reservation request;

receiving a zero reservation amount from the estimation algorithm, if the reservation request is sent within a designated silence period; and receiving a non-zero reservation amount from the estimation algorithm, if the reservation request is sent after the designated silence period ends.

5. The method as recited in claim 4, wherein the estimation algorithm is run by the cluster member that received the client request.

6. The method as recited in claim 4, further comprising rejecting the client request upon receiving a zero reservation amount from the estimation algorithm.

7. The method as recited in claim 4, wherein upon receiving a non-zero reservation amount from the estimation algorithm, the step of attempting to reserve additional rate capacity further comprises:

sending a reservation request to a reservation algorithm configured for determining whether or not sufficient rate capacity remains within the cluster to satisfy the reservation request;

receiving a zero reservation amount from the reservation algorithm, if insufficient rate capacity remains within the cluster to satisfy the reservation request; and receiving a non-zero reservation amount from the estimation algorithm, if sufficient capacity remains within the cluster to satisfy the reservation request.

8. The method as recited in claim 7, wherein the reservation algorithm is run by one of the plurality of cluster members elected to become reservation coordinator.

9. The method as recited in claim 7, further comprising rejecting the client request upon receiving a zero reservation amount from the reservation algorithm.

10. The method as recited in claim 7, wherein upon receiving a non-zero reservation amount from the reservation algorithm, the method further comprises:

updating the tree structure of the one cluster member with the non-zero reservation amount received from the reservation algorithm; and traversing the updated tree structure to get a new chain of buckets descending from the root node to the child node corresponding to the requested service or operation.

11. The method as recited in claim 10, wherein upon traversing the updated tree structure, the method further comprises:

admitting the client request, if the number of tokens can be added to each bucket within the new chain of buckets without exceeding the maximum rate specified for any bucket in the chain; or rejecting the client request, if adding the number of tokens causes any bucket within the new chain of buckets to exceed its maximum rate for that time period.

12. A method for releasing rate capacity from one member of a cluster comprising a plurality of cluster members, the method comprising:

receiving one or more client request, each having a weight assigned thereto, over the course of a current time period;

calculating an average rate for the current time period by summing the weights of the client request received during the current time period and dividing the sum by the current time period;

determining a current rate consumption trend by comparing the average rate calculated for the current time period to an average rate calculated for a previous time period for a workload dynamically distributed across said plurality of cluster members, wherein the current rate consumption trend is increasing, if the average rate for the current time period is higher than the average rate for the pervious time period;

steady, if the average rate for the current time period is equal to the average rate for the previous time period;

decreasing, if the average rate for the current time period is lower than the average rate for the previous time period; and releasing rate capacity from one member of the cluster based on the current rate consumption trend and current reservation amount allocated to that cluster member, said cluster member configured for running common applications and used to provide key databases, file sharing, business applications and consumer services and wherein rate capacity is released from the one member of the cluster if: (a) the current rate consumption trend is determined to be steady or decreasing, and (b) the one member of the cluster has more reserved rate than it is currently using.

13. The method as recited in claim 12, wherein the one member of the cluster is determined to have more reserved rate than it is currently using if a difference between the current reservation amount and the average rate for the current time period is greater than a predetermined amount.

14. The method as recited in claim 12, wherein rate capacity is not released from the one member of the cluster if: (a) the current rate consumption trend is determined to be increasing, or (b) the current reservation amount is zero.

* * * * *